HIGH TRACTION VEHICLE

Original Filed Oct. 10, 1966 2 Sheets-Sheet 1

INVENTOR.
CARL E. ENOS
BY
Naylor & Neal
ATTORNEYS

HIGH TRACTION VEHICLE

Original Filed Oct. 10, 1966 2 Sheets-Sheet 2

INVENTOR.
CARL E. ENOS
BY Naylor & Neal
ATTORNEYS

United States Patent Office

Re. 27,642
Reissued May 8, 1973

27,642
HIGH TRACTION VEHICLE

Carl E. Enos, Chico, Calif., assignor to Cummins Engine Company, Inc., Columbus, Ind.

Original No. 3,426,720, dated Feb. 11, 1969, Ser. No. 585,640, Oct. 10, 1966. Application for reissue May 18, 1970, Ser. No. 38,285
Int. Cl. B60f *3/00*
U.S. Cl. 115—1 R 8 Claims

Matter enclosed in heavy brackets [ ] appears in the original patent but forms no part of this reissue specification; matter printed in italics indicates the additions made by reissue.

ABSTRACT OF THE DISCLOSURE

An amphibious vehicle comprised of a pair of hull-like body sections coupled together in longitudinally aligned end-to-end relationship for pivotal movement relative to each other about a longitudinal extending axis. Each section is provided with a pair of drive wheels driven by an axle extending transversely through and within the confines of the section. Power is supplied to the axles by a drive shaft extending longitudinally through and between the sections in substantially coaxial relationship with the longitudinally extending axis about which the sections are adapted to pivot relative to each other. The drive shaft is driven by an engine mounted in one of the sections.

The present invention relates to a high traction vehicle and, more particularly, it is directed to such a vehicle of simplified construction employing articulated body sections to enable its tractive propulsion elements to maintain contact with irregular support surfaces over which the vehicle is traveling.

In the prior art, various types of high traction vehicles have been provided. These vehicles typically employ a four, or more, wheel drive arrangement and some type of flexible suspension for the wheels. This suspenson, usually, takes the form of resilient suspension structure similar to that used on conventional highway vehicles. As a result, prior art four wheel drive vehicles are generally only capable of traveling over a relatively smooth terrain. When used over extremely irregular terrain, the suspensions of such vehicles are unable to maintain the wheels in ground engagement, and frequently, the suspensions are fouled and severely damaged.

Certain high traction vehicles of the very sophisticated type such as have been used for heavy earth moving purposes, employ articulated chassis sections to maintain their drive wheels in continuous ground engagement, regardless of the terrain encountered. These vehicles, however, generally resort to complicated joints between the chassis sections and the components of the drive trains therefore. Thus, such vehicles are extremely expensive both to fabricate and maintain. Furthermore, the complicated chassis structures employed in such vehicles render them unsuitable for cargo carrying purposes and use over terrains of "marshy" character.

It is, accordingly, a principal object of the present invention to provide a high traction vehicle employing articulated body sections to maintain the tractive propulsion elements thereof in ground engagement.

Another object of the invention is to provide such a vehicle incorporating an improved coupling structure between the body sections and a cooperating simplified drive train arrangement.

Yet another object of the invention is to provide such a vehicle wherein the body sections are of hull-shaped configuration and adapted, together with the coupling structure, to house therein the drive train arrangement for the vehicle.

Still another object of the invention is to provide such a vehicle wherein the body sections confine, substantially entirely, the steering linkage employed therewith.

A further object of the invention is to provide such a vehicle of amphibious character and a prop construction adapted to be coupled directly to the drive train arrangement thereof to effect propulsion of the vehicle over water.

The basic vehicle of the present invention comprises independent first and second body sections of hull-shaped configuration coupled together for relative movement about the longitudinal axis extending therebetween by tubular segments joined to and opening through each of the sections and a longitudinally extending drive shaft extending through the segment into each of the sections. The basic vehicle is completed by drive structure comprising an engine disposed in one of the sections in operative association with the drive shaft and tractive propulsion means disposed on each of the sections in driving engagement with the drive shaft.

The foregoing and other objects and the details of the invention will become more apparent when viewed in light of the following description and the accompanying drawings, wherein.

Figure 1:
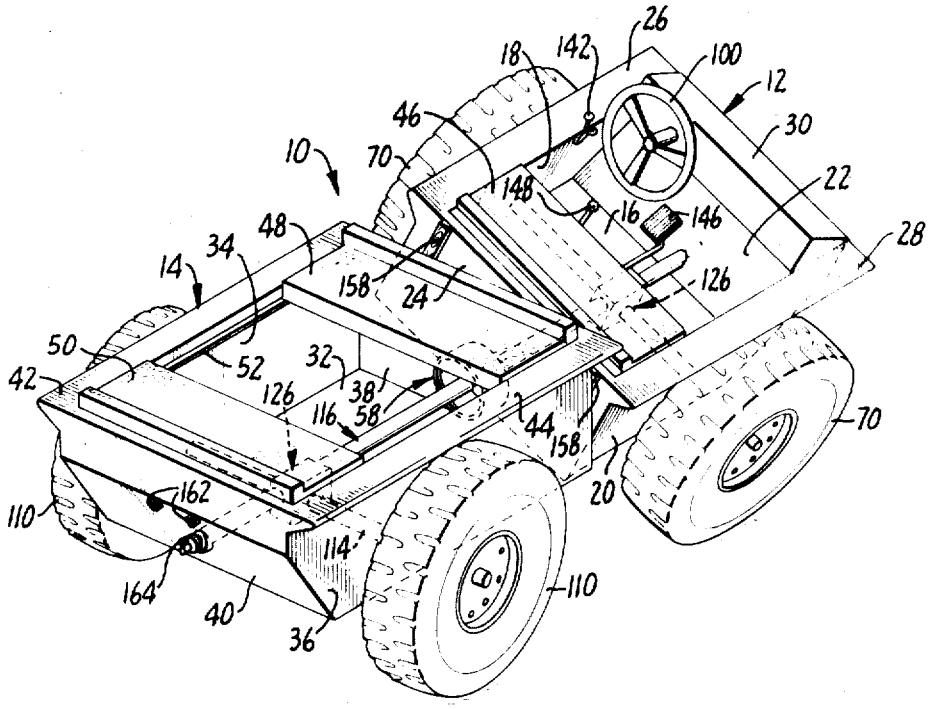
FIG. 1 is a perspective view of the vehicle showing the body sections thereof cocked in relation to each other to exemplify the manner in which the sections articulate to accommodate ground engagement when the vehicle is traveling over irregular terrain.
Figure 2:
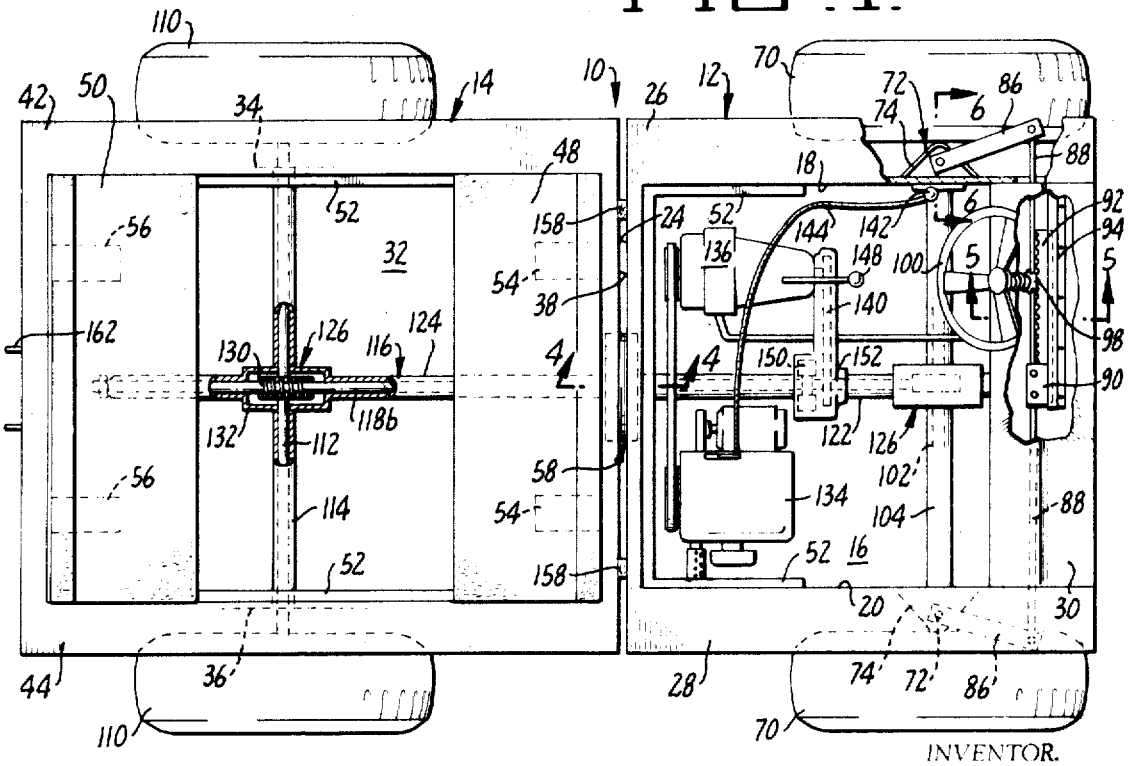
FIG. 2 is a plan view of the vehicle, partially in section, showing the body sections in horizontal alignment.
Figure 3:
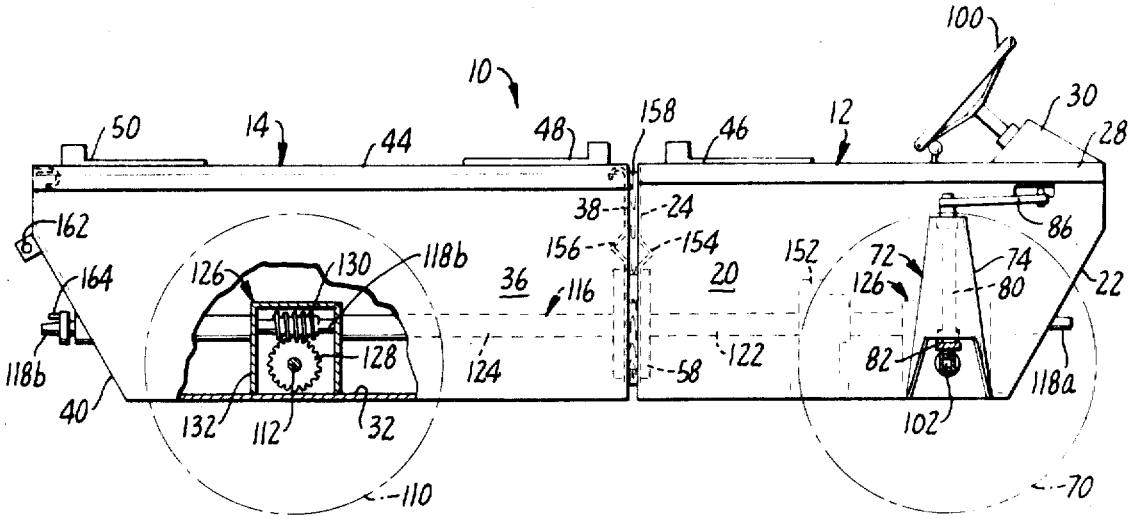
FIG. 3 is an elevational view of the vehicle, partially in section, showing the body sections in horizontal alignment.
Figure 5:
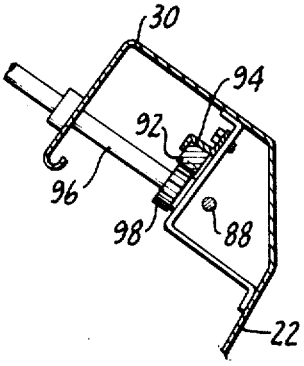
Figure 4:
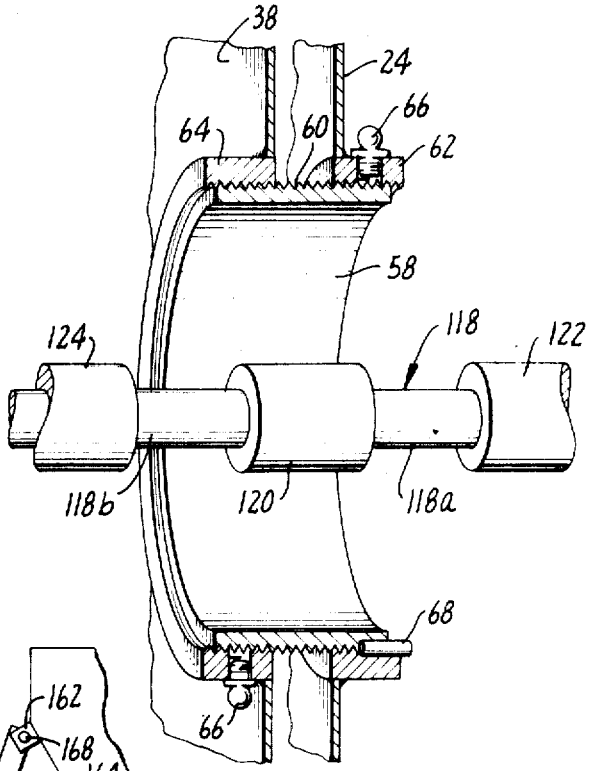
Figure 6:
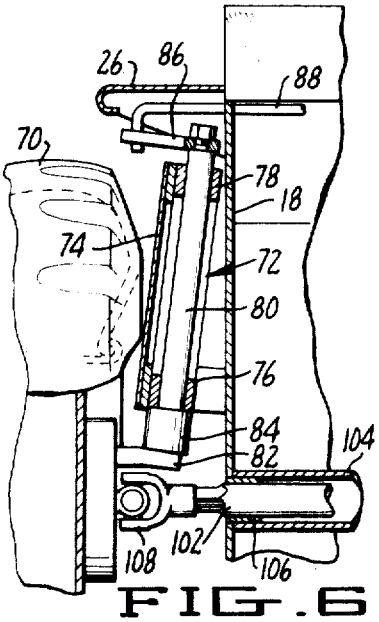
Figure 7:
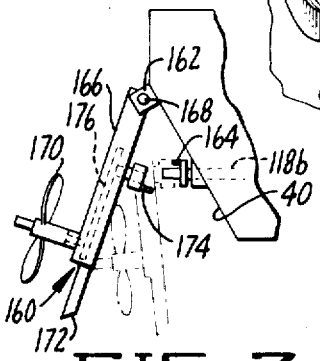

FIGS. 4, 5 and 6 are sectional views taken on the planes designated, respectively, by lines 4—4, 5—5 and 6—6 in FIG. 2; and, FIG. 7 is a partial elevational view illustrating a prop propulsion means which may be attached to the rear body section of the vehicle for driving engagement by the vehicle drive shaft.

Referring now specifically to the drawings, the inventive vehicle is designated therein in its entirety by the numeral 10. The vehicle comprises, as its basic elements, forward and rearward body sections 12 and 14, respectively. The forward body section 12 is defined by an integral wall portion of hull-shaped configuration comprising: a floor 16; side walls 18 and 20 fixed to and extending upwardly from the floor; front and rear walls 22 and 24 fixed to and extending upwardly from the floor between the side walls; and, rail portions 26 and 28 fixed to and extending upwardly from the wall portions 18 and 20, respectively, over the length between the front and rear walls. The forward body section also includes a cowl 30 extending rearwardly from the front wall 22 between the rails 26 and 28. The rearward body section 14 includes an integral wall portion similar to that of the forward body section, comprising: a floor 32; side walls 34 and 36 fixed to and extending upwardly from the floor; front and rear walls 38 and 40, respectively, fixed to and extending upwardly from the floor between the side walls; and, rail portions 42 and 44 extending outwardly from the upper edge of the side walls 34 and 36, respectively, over the length between the front wall 38 and rear wall 40.

The body sections 12 and 14 also include seats 46, 48 and 50 mounted therein for ready removal. The seat 46 is mounted on rails 52 fixed to and extending longitudinally of the walls 18 and 20. The seats 48 and 50 are slidably mounted on rails 52 fixed to and extending longitudinally of the walls 34 and 36. Center supports 54 and 56 are also mounted on the walls 38 and 40, respectively, to effect support of the seats 48 and 50.

The body sections 12 and 14 are coupled together for movement about a longitudinal axis extending therebetween by a structure best illustrated in FIG. 4. This structure comprises a tubular segment or sleeve 58 having external screw threads 60 therearound; an internally threaded annular element 62 threadably received on the segment 58 and welded, externally, to an opening therefor provided in the wall 24; and, an internally threaded annular element 64 threadably received on the segment 58 and externally welded to an opening provided therefore in the wall 38. The elements 62 and 64 each have grease fittings 66 received in openings extending therethrough in order to supply grease to the interfaces of the mating threads on these elements and the segment 58. The element 62 is pinned to the segment 58 by a removable pin 68 and, thus, relative rotation between this element and the segment is prevented. The element 64 is free to rotate about the segment 58 and, thus, relative pivotal movement between the sections 12 and 14 is provided. Upon the latter movement, the element 64 simply threads on the segment 58 without restriction.

Through the threaded engagement between the segment 58 and the elements 62 and 64, the segment 58 is sealed to the walls 24 and 38. This sealed characteristic is enhanced by providing grease to the interfaces between the threads on the segment 58 and the elements 60 and 62. The interrelationship of the segment 58 and elements 62 and 64 also has the advantage that, should the threaded portion of the segment engaged by the element 64 become worn, the area of rotation may be switched to an unworn threaded portion of the segment 58. This may be accomplished simply by removing the pin 68 from engagement between the segment 58 and element 62 and inserting this pin between the segment 58 and the element 64. In this event, the segment 58 is locked to the element 64 and rotation between the body section is provided by threading of the element 62 on the portion of the segment 58 extending thereinto.

The body section 12 is supported on wheels 70 through corresponding king-pin assemblies 72 disposed on either side of the section. Since the assemblies 72 correspond in structure and mode of operation, only the left assembly (see FIG. 6) will be described and like numerals will be used to designate the elements of both assemblies.

Referring now specifically to FIG. 6, the assembly 72 shown therein comprises: an inclined king-pin mounting bracket 74 having axially aligned bushings 76 and 78 fixedly mounted therein; a king-pin 80 rotatably received within the bushings and having fixed thereto and extending therefrom a wheel support bracket 82; a thrust bearing 84 disposed in bearing engagement between the bearing 76 and bracket 82; and, a steering arm 86 fixed to and extending laterally from the upper end of the king-pin. Through the steering knuckle structure thus provided by the king-pin assembly 72, the wheel 70 may be selectively turned to effect steering of the vehicle 10. Turning movement is imparted by means of steering linkage structure comprising tie rods 88 pivotally secured to the free end of each of the arms 86 and extending therefrom into pivotal engagement with a steering bracket 90. Selective steering is imparted through this linkage structure by a rack and pinion arrangement of conventional nature comprising: a rack 92 fixed to the bracket 90 and slidably received beneath the cowl 30 by a guide 94; a steering column 96 rotatably mounted on the cowl 30; a pinion 98 coaxially fixed to the column 96 in mating engagement with the rack 94; and, a steering wheel 100 fixed to the column 96 on the end thereof opposite the pinion 98.

The wheels 70 are driven by a unitary axle 102 extending transversely through the body section 12. The axle 102 is received in a tube 104 welded to and opening through the side walls 18 and 20. Sleeve bearings 106 (see FIG. 6) at either end of the tube 104 rotatably support the axle 102 within the tube. Universal joints 108 are drivingly connected to each of the wheels 70 and splined on each end of the axle 102 to establish driving connection between the axle and the wheels, while permitting steering movement through the king-pin assemblies 72. Although not illustrated, it is to be understood that the connection between the axle 102 and the right hand wheel 70 corresponds to that for the left hand wheel 70 shown in FIG. 6.

The body section 14 is supported on wheels 110 through means of an axle 112 extending transversely through the section. The axle 112 is fixedly secured to the wheels 110 and rotatably received within a tube 114 welded to and opening through the side walls 34 and 36. Although not illustrated, it is to be understood that the axle 112 is supported within the tube 114 by sleeve bearings disposed in either end thereof. These bearings correspond to the bearings 106 shown in FIG. 6. It is also preferable that these bearings, and the bearings 106, be provided with seal structure of conventional nature to maintain lubricant therearound while preventing the entrance of foreign matter thereto.

Driving movement is imparted to each of the axles 102 and 112 by a drive train structure 116 extending coaxially through the tubular segment 58 and longitudinally into each of the body segments 12 and 14. The structure 116 comprises: a longitudinally extending drive shaft 118 made up to segments 118a and 118b joined together by a coupling 120; tubular housing and support elements 122 and 124 coaxially received around the segments 118a and 118b, respectively, to effect the rotatable support thereof; and, worm gear torque transmitters 126 operatively connected between the segments 118a and 118b and the axles 102 and 112, respectively. The segments 118a and 118b extend through the walls 22 and 40, respectively, for selective connection to power take-off devices. For example, the segment 118a may be connected to a winch and the segment 118b may be connected to a prop drive attachment. An exemplary embodiment of the latter attachment will be described subsequently. The tubular housing and support elements 122 and 124 open through and are sealingly welded to the wells 22 and 40, respectively. Although not illustrated, it is to be understood that these elements are provided with bearing and seal structure of conventional nature to effect the rotatable support and sealing of the shaft 118.

The worm gear torque transmitters 126 correspond identically in structure, and for the sake of simplicity, only that operatively associated between the segment 118b and the axle 112 is illustrated. The torque transmitter 126 operatively associated between the shaft 118b and axle 112 comprises: a pinion 128 fixed to the axle 114 intermediate its ends: a worm driver 130 fixed to the segment 118b in mating engagement with the pinion 128; and, a housing 132 sealingly secured around the pinion 128 and driver 130 in fixed sealed communication with the tube 114 and tubular housing and support element 124. Although not illustrated in detail, it is to be understood that the pinion, worm gear and housing of the worm gear torque transmitter operatively associated between the segment 118a and axle 102 are disposed in a manner identical to the arrangement illustrated between the segment 118b and axle 112.

The body section 12 carries the prime mover structure for the vehicle 10 which is comprised of: an engine 134; a transmission 136 coupled to the engine 134 by a continuous belt 138; and, a chain drive 140 coupled between the transmission 136 and the segment 118a. It is to be understood that this structure is of conventional nature and may be varied without materially departing from the invention. Control of the prime mover structure is effected by a throttle lever 142 connected to the engine 134 by a cable 144 and a clutch pedal 146 and gear shift lever 148 operatively associated with the transmission 136.

Braking of the vehicle 10 is effected by a drive shaft brake 150 operatively associated with the segment 118a immediately behind the connection of the chain drive 140 thereto. In the preferred embodiment illustrated, this brake is housed in communication with the tubular housing and support element 122 surrounding the segment 118a by a housing 152. Although not illustrated, it is to be understood that the brake is provided with suitable activating means, such as a pedal or lever, connected thereto to effect its selective operation. Due to its location on the main drive shaft structure, all four wheels are simultaneously braked upon activation of the brake 150.

Operation of the vehicle 10 is effected through the steering, throttle, gear shift, and brake structure in much the same manner as a conventional automobile or tractor. During this operation, however, the body sections 12 and 14 are adapted to react in a manner much different than conventional fixed chassis vehicles. Specifically, these sections are free to pivot relative to each other about the longitudinal axis defined by the tubular segment 58. Thus, as the vehicle travels over irregular surfaces, the wheels 70 and 110 are maintained in continuous surface contact. The operation of the vehicle also departs materially from that of conventional vehicles in that the entire drive train structure is contained within the smooth body sections 12 and 14 and, thus, is not subject to fouling on obstructions that may be encountered on rough terrain. The steering structure is also similarly housed, substantially in its entirety, within the body section 12 and the confines of the king-pin mounting brackets 74. It is noted that these brackets, as can be seen from FIGS. 2 and 6, are of a frusto-pyramidical shape substantially surrounding the king-pins 80. Attention is also invited to the fact that the king-pin assemblies 72, together with the tie rods 88 extending therebetween, are disposed completely above the axle 102. All of these features result in a vehicle wherein fouling of the drive train and steering structure is minimized.

Attention is here directed to the fact that the interrelationship of the segment 58 and drive shaft 118 permits complete and unrestricted pivotal movement between the body segments 12 and 14. This results because the drive shaft 118 and segment 58 are concentrically located and, thus, pivotal movement of one body section relative to the other does not effect radial movement of the drive shaft. The latter characteristic also has the advantage that no universal joints are required on the drive shaft 118 to permit its radial movement.

It is here noted that rigidity of the body sections 12 and 14 is enhanced through means of corrugated sections 154 and 156 formed in the walls 24 and 38, respectively, above the segment 58. Rigidity of the respective body sections during vehicle operation is also enhanced by slide blocks 158 mounted on the wall 24 on either side of the segment 58 in direct opposition to the wall 38. These blocks are disposed so as to maintain sliding engagement with the wall 38 at all times. Thus, twisting stresses on the segment 58 are minimized.

Because of the hull-shaped configuration of the body sections 12 and 14, and the sealed character of all elements extending therethrough, the vehicle 10 is highly buoyant, and capable of traveling over water. During this travel, propulsion may be effected simply by the paddle wheel action of the wheels 70 and 110. If it is desired to increase the propulsion of the vehicle on water beyond the capability of the wheels, a prop drive attachment 160 (see FIG. 7) may be provided on the body section 14. To facilitate this attachment, mounting ears 162 are fixed to the wall 40 and a drive dog 164 is fixed to the end of the segment 118b extending rearwardly of the wall 40. The attachment 160 comprises: an arm structure adapted to be pivotally mounted between the ears 162 by pins 168; a prop 170 rotatably mounted on the arm structure 166; a guard 172 fixed to the arm structure 166 and extending therefrom beneath the lowermost extremity of the prop 170; a dog engaging element 174 rotatably mounted on the structure 166 for engagement with the dog 164 upon swinging of the structure toward the lower portion of the body section 14; and, a continuous belt sheaved between the support axles for the prop 170 and element 174. In operation, when the attachment 160 is in the lower phantom line position illustrated in FIG. 7, the prop 170 is driven by take-off from the segment 118b. During this operation, should the guard 172 strike an obstruction, the arm structure 166 is free to swing upwardly to avoid damage and hang-up. Upon the latter occurrence, the dog 164 and element 174 disengage and, thus, drive to the prop 170 is interrupted.

From the foregoing description, it is believed apparent that the present invention enables the attainment of the objects initially set forth herein. In particular, the invention provides a vehicle of amphibious nature and simplified construction having articulated body sections which house and shield substantially all drive and steering structure. It is to be understood, however, that the invention is not intended to be limited to the specific details herein illustrated and described, but rather is defined by the following claims.

What is claimed is:

1. A vehicle comprising:

(A) independent first and second body sections, said sections each comprising a continuous wall portion of hull-shaped configuration;

(B) a rigid sleeve extending longitudinally between said body sections and opening through the respective wall portions thereof to define a longitudinally extensive passage therebetween, said sleeve comprising, at least in part, a longitudinal section provided with external screw threads therearound;

(C) first and second elements mounted, respectively, on the wall portions of said first and second body sections and engaged with said sleeve against substantial rectilinear movement relative thereto, at least one of said elements comprising an internally threaded collar fixed to body section upon which it is mounted and threadably received upon the threads of said longitudinal section for rotation relative thereto;

(D) a drive shaft extending longitudinally through said sleeve and into each of said body sections;

(E) prime mover means disposed in one of said body sections and operatively associated with said drive shaft to impart rotation thereto;

(F) propulsion means for said vehicle disposed, respectively, on each of said body sections; and, (G) transmission means operatively associated with each of said propulsion means and said drive shaft to impart driving force from said shaft to said propulsion means.

2. A vehicle comprising:

(A) independent first and second body sections, said sections each comprising a continuous wall portion of hull-shaped configuration;

(B) coupling means securing said body sections together for substantially unrestricted pivotal movement about an axis extending longitudinally therebetween and against rectilinear movement relative to each other;

(C) a tubular segment extending between said body sections in substantially concentric relationship to said axis, said segment opening through the wall portions of said respective body sections to define a longitudinally extensive passage therebetween;

(D) a drive shaft extending longitudinally through said tubular segment into each of said body sections, said shaft extending completely through one of said body sections so as to have an end disposed externally of the wall portion of said section at an area of said portion opposite the opening of said tubular segment therethrough;

(E) prime mover means disposed in one of said body sections and operatively associated with said drive shaft to impart rotation thereto;

(F) primary propulsion means for said vehicle disposed, respectively, on each of said body sections, said propulsion means each comprising:

(1) an axle extending transversely through the body section upon which said means is disposed, said axle having a central portion confined within the wall portion of said section and end portions disposed externally of said wall portion;

(2) wheels drivingly secured to the end portions of said axle:

(G) secondary propulsion means disposed on the body section having the drive shaft extending completely therethrough, said means comprising:

(1) an arm pivotally secured to said section and depending downwardly and externally therefrom for swinging movement towards and away from the externally disposed end of the drive shaft;

(2) a prop mounted on said arm for rotation about an axis extending longitudinally of said body section;

(3) an element rotatably mounted on said arm for driving engagement with the externally disposed end of the drive shaft upon swinging of said arm towards said end; and, (4) drive transmission structure coupled between said element and prop to impart rotation from said element to said prop;

(H) transmission means operatively associated with each of said primary propulsion means and said drive shaft to impart driving force from said shaft to said propulsion means, said means comprising gears on said drive shaft and each of said axles confined, respectively, within each of said body sections.

3. A vehicle comprising:

(A) independent first and second body sections, said sections each comprising a continuous wall portion of hull-shaped configuration;

(B) a drive shaft extending longitudinally between and into said body sections through openings in the wall portions of said sections provided therefor;

(C) coupling means securing said body sections together for pivotal movement relative to each other about an axis substantially co-axial with the longitudinal axis of said shaft, said means functioning to maintain sections in end to end longitudinal alignment against relative pivotal movement about axes extending transversely thereof;

(D) prime mover means disposed in one of said body sections and operatively associated with said drive shaft to impart driving rotation thereto;

(E) propulsion means for said vehicle disposed, respectively, on each of said body sections, said means each comprising:

(1) an axle extending transversely through the body section upon which said means is disposed, said axle having a central portion confined within the wall portion of said section and end portions disposed externally of said wall portion; and, (2) wheels drivingly secured to the end portions of said axle;

[(E)] *(F)* transmission means operatively interposed between said shaft and each of said axles to impart rotary motion from said shaft to said axles, said means being confined within the wall portions of said sections; and,

[(F)] *(G)* means mounting the wheels of at least one of said propulsion means to the body section through which the axle of said propulsion means extends for pivotal steering movement about generally upright axes[.], *the wall portions of the respective body sections including opposed substantially planar surfaces around the openings therethrough provided for passage of said drive shaft, and further including slidably engageable thrust transmitting surfaces disposed on said opposed planar surfaces.*

[4. A vehicle according to claim 3 wherein, said coupling means sealingly closes the openings through the wall portions of said sections provided for passage of the drive shaft to fluid flow therethrough.]

[5. A vehicle according to claim 3, wherein said coupling means comprises:

(A) a rigid sleeve extending longitudinally around said drive shaft over the length thereof extending between said body sections; and, (B) sleeve engaging means mounted, respectively, on said first and second body sections in peripheral engagement with said sleeve to restrain said sections from longitudinal misalignment relative to said sleeve, at least one of said means being rotatable relative to said sleeve about the longitudinal axis thereof.]

[6. A vehicle according to claim 3 wherein, the wall portions of the respective body sections include opposed substantially planar surfaces around the openings therethrough provided for passage of said drive shaft, and further including slidably engageable thrust transmitting surfaces disposed on said opposed planar surfaces.]

7. A vehicle according to claim 3 wherein the means mounting the wheels of at least one of said propulsion means for steering movement comprises:

(A) steering knuckle means operatively secured between each of said wheels and the body section through which the axle of said propulsion means extends to effect support of each of said wheels for pivotal movement about a generally upright axis, said knuckle means being disposed above the level of said axle;

(B) steering linkage means secured to and extending between said knuckle means to impart simultaneous steering movement to said wheels, said linkage means being disposed, over the majority of the length thereof, within the body section through which said axle extends; and, (C) steering imparting means operatively secured to said linkage means within said body section to selectively impart steering force to said linkage means.

8. A vehicle according to claim 3, wherein;

(A) said drive shaft extends completely through one of said body sections so as to have an end disposed externally of the wall portion of said section at an area of said portion opposite the opening of said tubular segment therethrough; and, (B) the propulsion means disposed on said section further comprises:

(1) a prop mounted on and externally of said body section adjacent said area for rotation about an axis extending longitudinally of said body section; and, (2) means operatively coupling the end of the shaft to said prop to impart rotation from said shaft to said prop.

9. A vehicle according to claim 8, wherein:

(A) said prop is mounted on said body section on an arm pivotally secured to said section and depending downwardly therefrom for swinging movement toward and away from the end of said shaft; and, (B) said means coupling said shaft to said prop comprises:

(1) an element rotatably mounted on said arm for driving engagement with the end of said shaft upon swinging of said arm toward said end; and, (2) drive transmission structure coupled between said element and prop to impart rotation from said element to said prop.

*10. A vehicle comprising:*

*(A) independent first and second body sections, said sections each comprising a continuous wall portion of hull-shaped configuration;*

*(B) a drive shaft extending longitudinally between and into said body sections through openings in the wall portions of said sections provided therefor;*

*(C) coupling means securing said body sections together for pivotal movement relative to each other about an axis substantially coaxial with the longitudinal axis of said shaft, said means functioning to maintain said sections in end to end longitudinal alignment against relative pivotal movement about axes extending transversely thereof;*

*(D) prime mover means disposed in one of said body sections and operatively associated with said drive shaft to impart driving rotation thereto;*

*(E) propulsion means for said vehicle disposed, respectively, on each of said body sections, said means each comprising:*

*(1) an axle extending transversely of and supported by the body section upon which said means is disposed; and,*

*(2) wheels drivingly secured to end portions of said axle;*

*(F) transmission means operatively interposed between said shaft and each of said axles to impart rotary motion from said shaft to said axles; and,*

*(G) means mounting the wheels of at least one of said propulsion means to the body section through which the axle of said propulsion means extends for pivotal steering movement about generally upright axes; each wall portion including a substantially planar section and said respective planar sections being oppositely*

*disposed; said coupling means including a tubular segment extending between said body sections in substantially concentric relationship to said axis, said segment defining an interior in communication with said body section openings, said interior accommodating said drive shaft as it extends between said sections; and, further, including slidably engageable surfaces disposed on said opposed planar sections.*

*11. A vehicle according to claim 10 wherein said coupling means includes a tubular segment extending between said body sections in substantially concentric relationship to said axis, said segment defining a longitudinally extensive passage accommodating said drive shaft as it extends between said body section openings; said transmission means comprising mating gears on said drive shaft and each of said axles.*

References Cited

The following references, cited by the Examiner, are of record in the patented file of this patent or the original patent.

UNITED STATES PATENTS

| | | | |
|---|---|---|---|
| 2,366,166 | 1/1945 | Willock | 280—112 |
| 3,057,319 | 10/1962 | Wagner | 115—1 A |
| 2,653,696 | 9/1953 | Moon | 180—45 X |
| 2,393,324 | 1/1946 | Joy | 280—111 X |
| 3,199,486 | 8/1965 | Gillois et al. | 115—1 |

FOREIGN PATENTS

| | | | |
|---|---|---|---|
| 251,766 | 5/1926 | Great Britain | 280—111 |

ANDREW H. FARRELL, Primary Examiner

U.S. Cl. X.R.

280—111